United States Patent [19]
Ruck et al.

[11] Patent Number: 5,812,248
[45] Date of Patent: Sep. 22, 1998

[54] PROCESS AND DEVICE FOR GENERATING GRAPHICAL REAL-TIME DIRECTIONAL INFORMATION FOR DETECTED OBJECT TRACES

[75] Inventors: Bodo Ruck, Karlsruhe; Andreas Kaiser, Ettlingen, both of Germany

[73] Assignee: TSI Corporation, St. Paul, Minn.

[21] Appl. No.: 571,910

[22] PCT Filed: Jun. 9, 1994

[86] PCT No.: PCT/DE94/00653

§ 371 Date: Mar. 25, 1996

§ 102(e) Date: Mar. 25, 1996

[87] PCT Pub. No.: WO95/01572

PCT Pub. Date: Jan. 12, 1995

[30] Foreign Application Priority Data

Jul. 1, 1993 [DE] Germany .......................... 43 21 876.8

[51] Int. Cl.[6] .............................. G01P 3/36; G01P 1/712
[52] U.S. Cl. .......................................... 356/28; 73/861.06
[58] Field of Search .......................... 356/128; 73/861.06

[56] References Cited

U.S. PATENT DOCUMENTS 4,866,639  9/1989  Adrian .
4,988,191  1/1991  Adrian et al. .............................. 356/28
5,153,665  10/1992  Weinstein ................................. 352/28
5,491,642  2/1996  Wormell et al. ........................ 364/509

FOREIGN PATENT DOCUMENTS

0 044 730 A2  1/1982  European Pat. Off. .
29 37 003 A1  9/1979  Germany .
57-57265  4/1982  Japan .

*Primary Examiner*—Mark Hellner
*Attorney, Agent, or Firm*—Frederick W. Niebuhr

[57] ABSTRACT

A process and apparatus are disclosed for generating object traces representing the movement of objects through a measuring space. The measuring space can be illuminated by a laser or other light source, or alternatively the objects can be self-illuminating. In either event, light from the objects is detected over a finite acquisition time, to generate the object traces. During a predetermined portion of the acquisition time, preferably near the end, one of several parameters that govern the object trace width is altered to increase the width, thereby giving the object trace the form of an arrow or vector. The altered parameter can be the brightness of illumination, the sensitivity of the image detector, or the position or state of system components, in particular the image detector, a lens or other active optical component between the objects and the detector, or an optical component between the light source and the objects.

29 Claims, 7 Drawing Sheets

PROCESS AND DEVICE FOR GENERATING GRAPHICAL REAL-TIME DIRECTIONAL INFORMATION FOR DETECTED OBJECT TRACES

BACKGROUND OF THE INVENTION

The invention concerns a process for the determination of the direction of recorded traces of moved objects immediately upon acquisition by an image detector. The detected object traces upon acquisition provide graphical information in arrow or vector form. The objects can be illuminated or self-illuminating bodies of various sizes. Small illuminated particles such as molecules or particles transported together in a flow, and larger illuminated moved objects can reproduce traces on an image detector. It is therefore a presupposition of the process that the objects produce traces on the detector element during the exposure or integration time of the image detector. It is characteristic of the process that the detected object traces are provided upon acquisition with graphical information in arrow or vector form, either through the changing of the light output irradiating the image detector or through the changing of the sensitivity of the image detector.

Similar processes and devices, without the graphical direction identification of the invention, are used in flow and particle measurement technology. Such technology involves inferring from detected particle traces the velocity field of a flow or a particle phase in an illuminated measurement space. The objects or particles employed as tracers are in many cases so small that they can follow the current with sufficient precision. In general, they are illuminated by a laser light source, whose light beam is transformed into a light sectional plane. The acquisition of the particle traces during an exposure or integration time adapted to the velocity of the particle movement leads to particle traces on the image detector (e.g. film, semiconductor image sensor). The traces permit the velocity field of the current to be seen. This sort of trace acquisition based on illuminated or self-illuminating particles is also found in other ranges of object size, for example in process engineering involving following larger particles, or in physics, where traces of particles and nuclear components are made visible, or in medical technology, e.g. following the movement of blood corpuscles.

A rough classification of existing particle movement measuring follows from whether measurement is taken at a fixed point in the measurement space over a period of time, or whether an extended region of the measurement space is surveyed at a fixed point in time. Point measurement processes provide for the most part time-averaged information, and whole field measurement processes ("Whole Field Techniques") provide predominantly momentary movement information. The present invention belongs in the sphere of the whole field measurement processes, in which object traces in an entire image field (a section of a measurement space) are recorded and analyzed at a fixed point in time. Hitherto, particle tracing anemometry, also called "particle tracing anemometry" (PTA), was applied to such measurement tasks, as well as laser speckle velocimetry, also called particle image velocimetry (PIV). With PTA, the entire image-producing trace of a particle is recorded, while with PIV, through the pulse activity of the illumination source, only the starting and ending points of the particle trace are recorded. In these processes, as well as holographic recording processes, object traces are certainly very easily recorded, but only with respect to the magnitude of the velocity. Without additional aids, the direction of the movement cannot be inferred from the recorded particle or object trace.

For this reason, experimenters in particle tracing anemometry have developed encoding processes that allow identification of the direction of an object trace. For example, through the interruption of the illumination, a sort of pulse-encoding of the object trace is obtained that distinguishes the direction of the movement. See Khaligi, B., Yong H. Lee, 1989: "Particle Tracking Velocimetry: An Automatic Image Processing Algorithm", Applied Optics, Vol. 28, No. 20, pp. 4328–4332. A whole-field recording so obtained must afterwards be subjected to a very expensive and time-consuming analysis, to yield graphical direction information in arrow or vector form, based on the broken line image. Only after such analysis are the recordings of value to the viewer, since the graphical arrow or vector form is immediately associated with the direction of the flow.

An additional recent encoding process is based upon acquiring particle traces by means of a sensitivity jump in the detector, in order that directional information may be recorded in the gray values of the image pixels. With this process, likewise, the image obtained must be modified in order to draw vector arrows on the particle traces. See Wung, T. S., Tseng, F. G., 1992: ; "A Color-coded Particle Tracking Velocimeter with Application to Natural Convection", Experiments in Fluids 13, pp. 217–223. The received image must subsequently be analyzed to derive the vectors or arrows from the particle traces (Wung et al). This process is very similar to the process described in Mitsubishi, J. Shiyouhei, N., 1982: "Method for Measuring Flow Trace Speed", Jap. Patentanmeldung JP-A-57-57265, Int. CL. G01P5/20, with which the same result is achieved, albeit through the altering of the illumination during the acquisition. Both processes are based on analysis of the differences in brightness as commonly occurs, for example, in photographs. Such differences in brightness do not lead to perceptible alterations of the object trace contours. For this reason there is no mention in either Wung et al or Mitsubishi et al of a broadening of recorded traces through illumination differences. With these two processes one arrives at a vector field only through a subsequent analysis.

These PTA-measurement and analysis processes, up to now, have failed to generate graphical information in arrow or vector format simultaneously with the acquisition of the traces, to eliminate the need for subsequent time-intensive follow-up treatment of the trace acquisition. These existing PTA measurement and evaluation processes have not been successful in producing, immediately upon the acquisition of the traces, graphical information in arrow or vector form such that the subsequent time-intensive after-treatment of the trace acquisition up to vectorization is inapplicable.

Experimenters with particle image velocimetry have attempted to obtain directional information through encoding processes. Examples include processes in which the first illumination pulse occurs in a different color than the second, which upon an analysis with the aid of a color selection allows the direction of the trace to be known. See Cenedese, A., Paglialunga, A., 1989: "A New Technique for the Determination of the Third Velocity Component with PIV", Experiments in Fluids, 8, pp. 228–230. Even with this newest technique in PIV, the analysis of the double-exposure acquisition and the vectorization of the traces requires a separate, digital analysis step. Digital analysis of the previously digitized particle-trace acquisition on computers requires time, e.g. about 20 minutes for the analysis, i.e. vectorization, of an image. See Buchhave, P., 1992: "Particle Image Velocimetry—Status and Trends", Experimental Thermal and Fluid Science, 5, pp. 586–604.

Accordingly, the problem that forms the basis of the invention is to provide a process that quickly and in a simple and convenient manner creates a vectorization of an image field with object traces. An additional problem for the invention is to specify a device for carrying out the process.

SUMMARY OF THE INVENTION

The problem is solved by a process for the making visible, on object traces, direction and velocity information. This results from a reproduction of moving object traces on an image detector during a finite acquisition time. The process is characterized by the fact that during the acquisition time of the object traces, at least one of the process parameters is changed in such a way that the width of the emerging object trace undergoes a corresponding change, preferably to provide the form of an arrow (vector).

The solution of this problem is based on the idea that during the acquisition, the trace reproduced on the detector can be changed in its width through an appropriate changing of the detected light output of moved objects or through a sensitivity change of the image detector. At the end of a trace, i.e. toward the end of the acquisition time for an image, a sudden change in the trace width can be produced that corresponds graphically to an arrow or vector form. One form of implementation of the invention involves changing the illumination. Sufficiently differently illuminated points (objects) of equal size, upon reproduction through a lens, result in image points of different size on the detector surface. This is due to the fact that with high light output the peripheral rays, distant from the optical axis but passing through the lens and therefore detectable, are subject to conventional reproduction errors of a lens or lens system. Consequently, the image point, with constant detector sensitivity, is enlarged. The effect of the image-point broadening can likewise be achieved in the case of constant luminosity of the object points, by raising the sensitivity of the image detector, whereby the peripheral rays subject to reproduction errors are detectable upon reproduction and broaden the image point. In addition to the reproduction errors of a lens, "blooming" effects of semiconductor image sensors arise after certain light power or sensitivity limits are exceeded, can enlarge the image point, which can be controlled either through changing the incident light power or the sensitivity of the image sensor, and is thus embraced by this invention.

In the present invention, therefore, the trace broadening is dependent in general on the combined effects of point blurring characteristics and aberrations of lenses, "blooming" or over-control effects of image detectors, and with illumination by means of laser beams, from non-geometric optical spreading behavior (Gaussian optics) of laser beams. The additional trace broadening arising in this way lies in the order of magnitude of the width of the exit trace.

Naturally the illumination of the object can also result from a pulsed laser, as long as the pulse duration is longer than the acquisition time. Usually nowadays with the application of two-dimensional image detectors, only a two-dimensional object trace is generated. For this a light section in the measurement plane suffices for the illumination of objects. The light section is generated either by spreading a laser beam using a cylindrical lens combination, or by the rapid sweeping of an unspread laser beam in a plane using an oscillating or scanning mirror device. As an alternative to visible light, the object can be illuminated with invisible light whereby it is assumed that the image detector is sensitive to the input radiation.

The trace broadening and the graphical form thereby achieved on the image detector as an arrow (vector) can also be achieved by mechanical adjustment elements, which move either the imaging optics or components, or the detector, (e.g. at the end of the acquisition time) in extremely rapid circular motions of small radii. The motions can be managed, for example, by suitably controlled piezo-electric adjustment elements. By changing the radius of the circular motion with time, the width of the recorded traces is altered. In this way an arrow can be generated.

Instead of motion in a plane perpendicular to the optical axis of an imaging optical system, motion in the direction of the optical axis can occur with the purpose of defocusing the object trace directed onto the image detector, and to thereby broaden it. The defocusing occurs in such a way that the traces are likewise formed as an arrow (vector).

The present invention allows the vectorization of the particle traces from an acquired image field immediately upon the acquisition. The rapidity of the reproduction of the vector field in a current space is not to be surpassed, for it takes place in real time. The number of present image fields per second, acquired and already analyzed upon acquisition according to the invention, is limited only by the image-acquisition system (e.g. Videonorm). With the use of high-speed video systems, acquisition can be in the range of several thousand images per second.

The invention thus makes possible the real-time vectorization of object traces immediately upon acquisition, and can thereby perform what until now seemed impossible. The invention facilitates taking the described measurements incomparably faster, and substantially more cost-effectively than whole-field measurement processes commonly used hitherto.

BRIEF DESCRIPTION OF THE DRAWINGS

Further advantages and features of the invention follow from the claims and from the following description, in which implementation examples of the invention are explained in detail with the aid of the drawings, in which:

DETAILED DESCRIPTION OF THE PREFERRED EMBODIMENTS

Figures 1, 2:
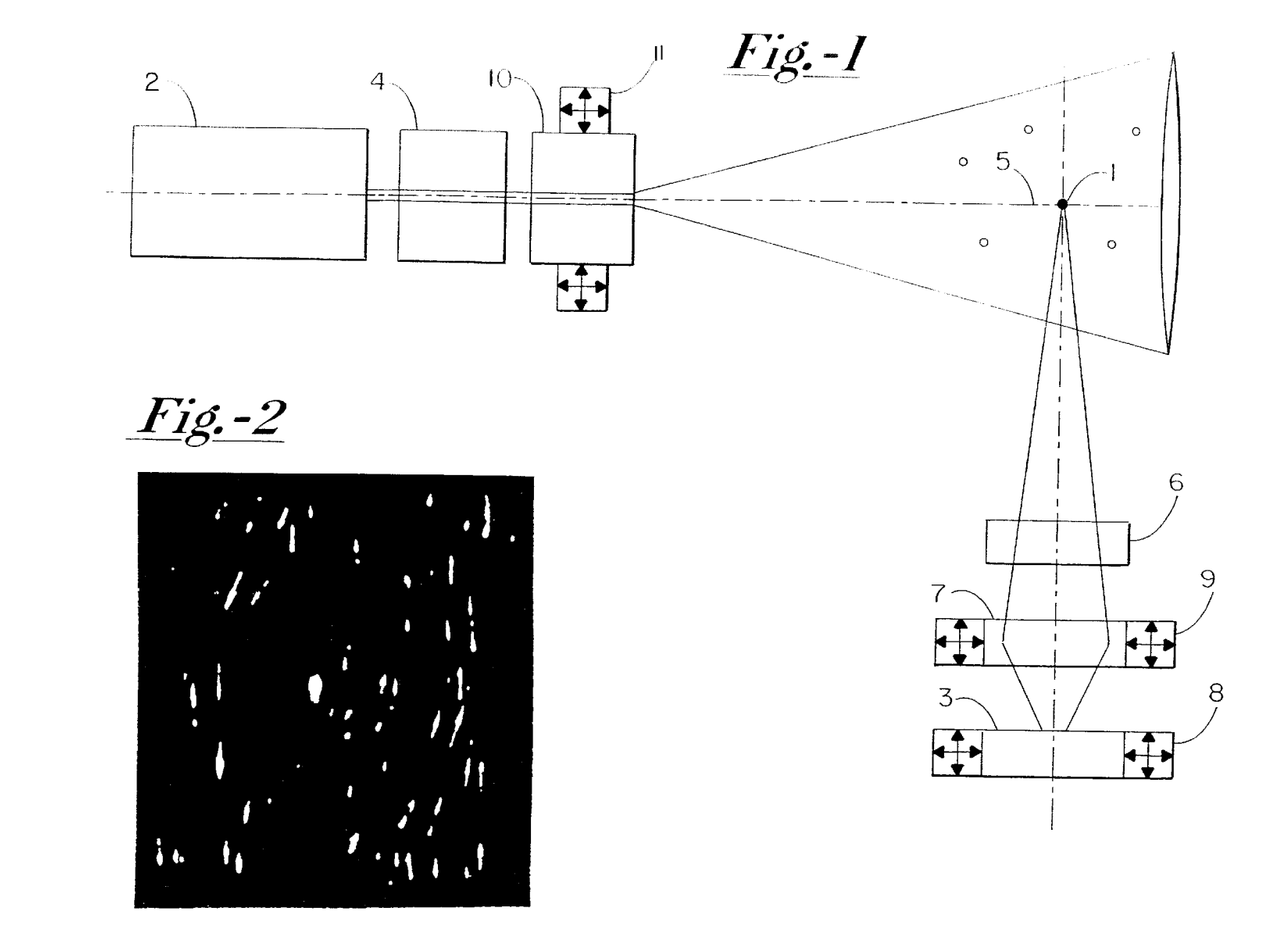
FIG. 1 is a schematic view of the invention in which the different forms of implementation are represented collectively.
FIG. 2 shows an image obtained in accordance with one of the implementation forms of the invention, of particle traces with the graphical direction information in arrow or vector form according to the invention.

In FIG. 1 various possibilities for the realization of the invention are represented collectively. The invention can be realized by the changing of the illumination power of the objects (1) in a light section (5), with either the laser light source (2) being directly modulated or optically active components (4) undertaking the light output modulation. Alternatively, optically active components (6) can change the detected scattered light power on the reception side. Equally conceivable is an implementation in which either the sending optics (10) or the receiving optics (7) or the image detector (3) is muddled or defocused during the acquisition time through adjustment elements (11,9,8).

FIG. 2 shows a typical trace acquisition obtained with an implementation in accordance with the invention. The graphical direction information becomes distinct as an arrow or vector shape.

Figure 3:
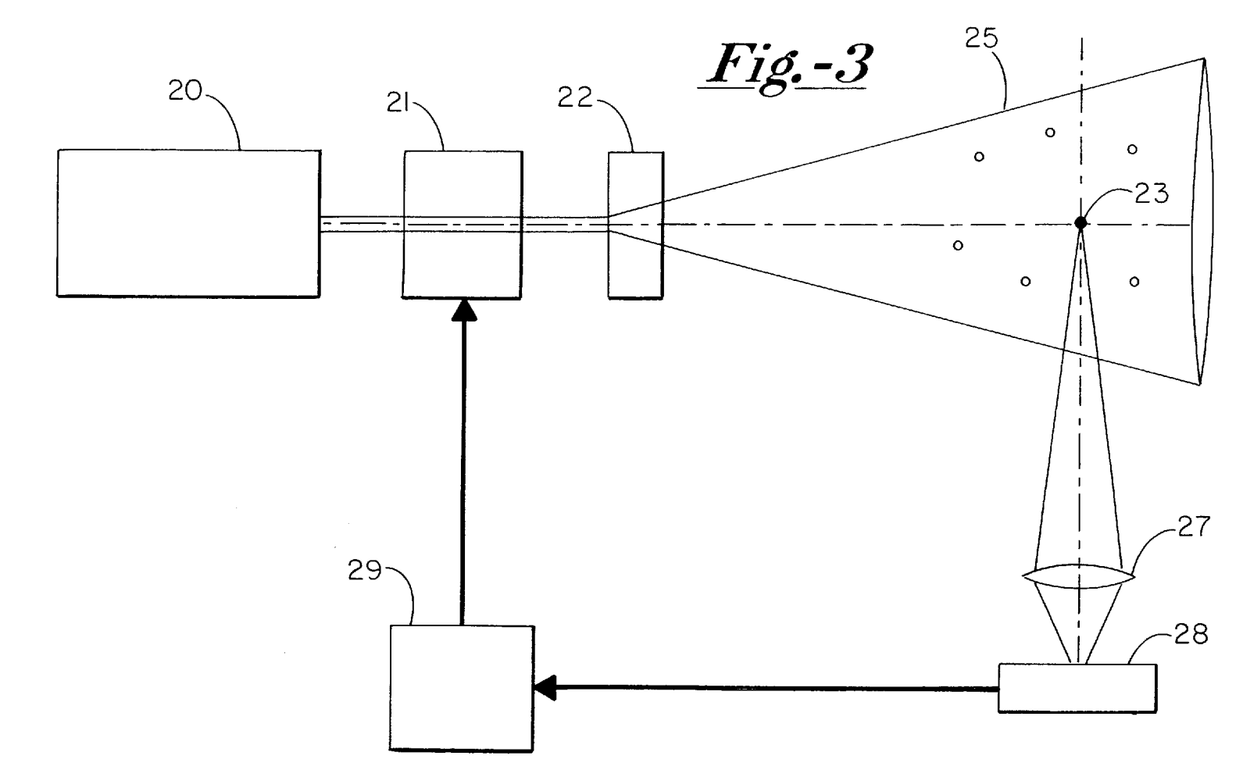
FIG. 3 is a schematic view of an implementation of the invention in which the light output of the laser beam illuminating the objects is modulated or changed by an optically active component synchronized with the image detector.

FIG. 3 shows an implementation of the invention in which the light beam (31) of a laser (20) is guided by an optically active component (21) that changes the light power during the acquisition time. The laser beam undergoes a broadening by means of sending optics (22), and forms a light section (25). The objects to be followed (23) move within the light section. The light scattered by the objects is reproduced via a lens (27) on the image detector (28), which is synchronized with the control unit (29) of the optically active component (21). By changing the light power during the acquisition time, e.g. at the end of an acquisition, the traces recorded on the image detector are broadened in such a manner that a graphical direction information results.

Figure 4:
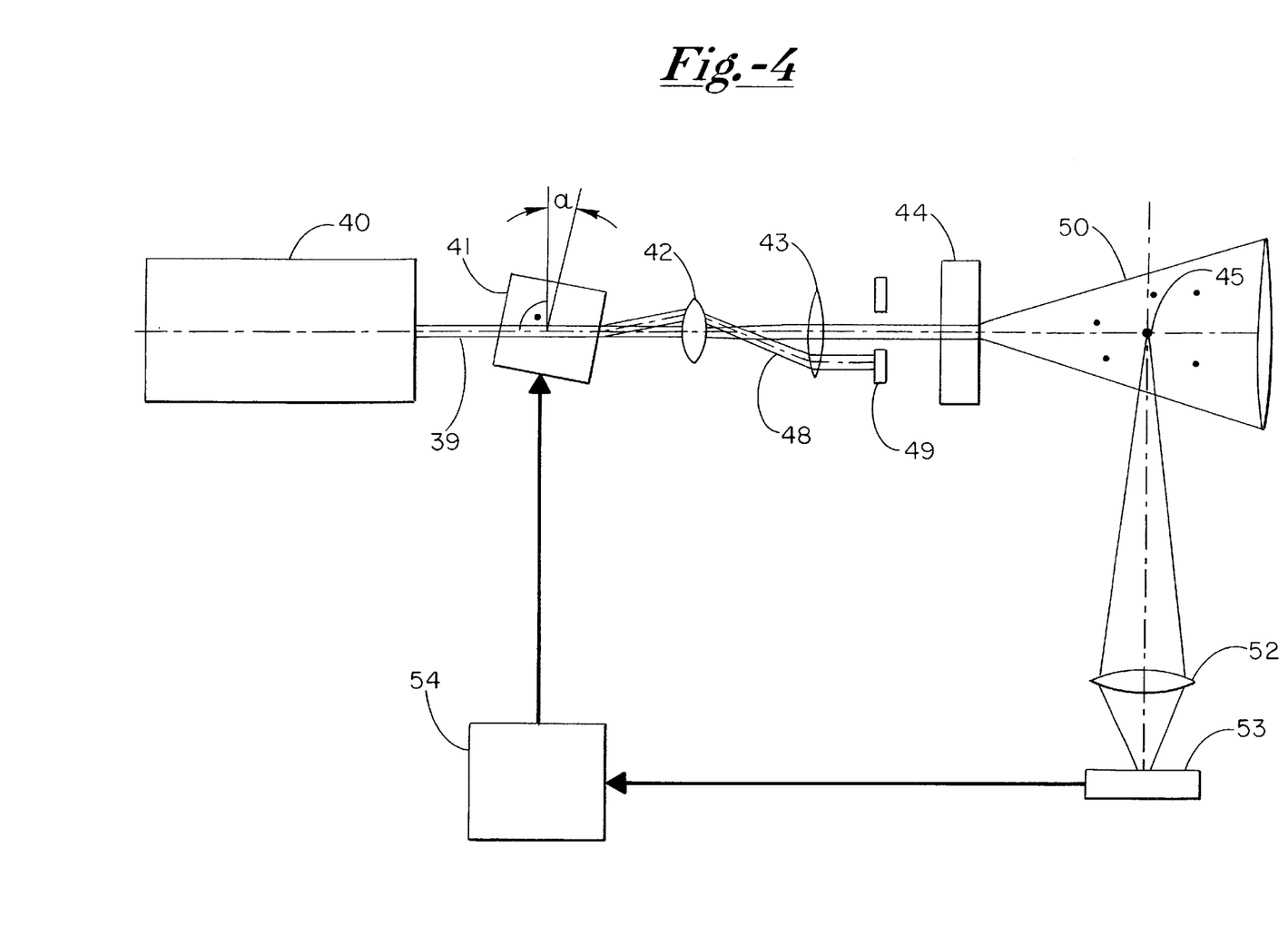
FIG. 4 shows a particular implementation of the invention in which an acousto-optical cell (Bragg cell, Kerr cell) modulates the output of the laser beam illuminating the objects.

FIG. 4 shows a particular implementation of the device shown in FIG. 3, in which modulation of the illuminating light power is accomplished with a Bragg cell (41). With this device the beam (39) of a laser (40) is led through Bragg cell (41), which is driven by a control unit (54). Through appropriate modulation of the drive frequency the light power in the light section (50) produced by the sending optic (44) is changed during the acquisition time. The high order beams (48) produced by the Bragg cell (41) are cut out by means of a suitable lens cut-out device (42,43,49). Subsequently, the light irradiating from the objects (45) is reproduced via a lens (52) on the image detector (53), which is synchronized with the control unit (54) of the Bragg cell (41).

Figure 5:
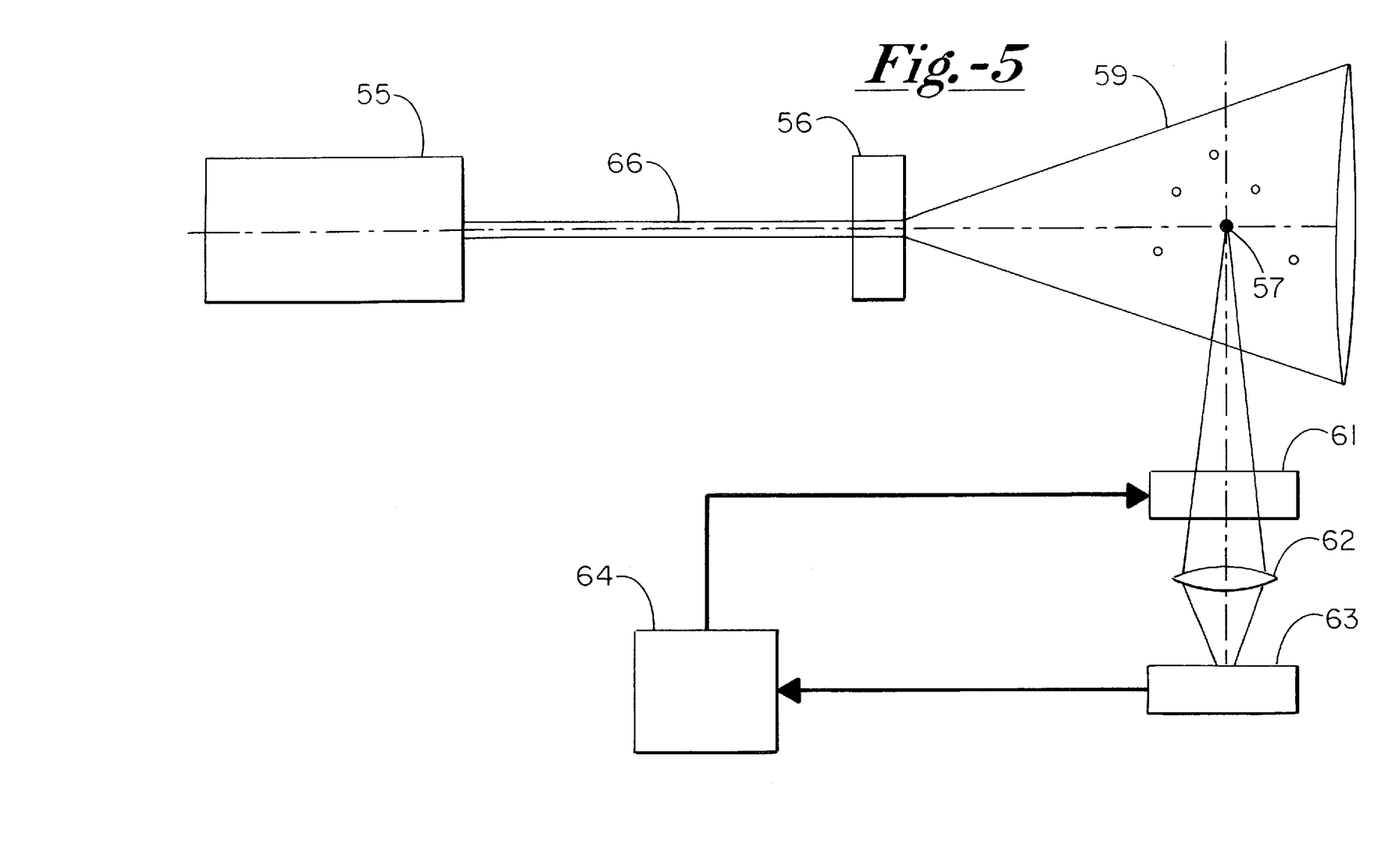
FIG. 5 shows an implementation of the invention in which the light power from the objects incident upon the detector is appropriately modulated or changed by an optically active component synchronized with the image detector.

In FIG. 5, the light beam (66) of a laser (55) is broadened out by sending optics (56) into a light plane (59). Objects (57) scatter the light, which is guided by an optically active component (61) and a lens (62) onto the image detector (63). The optically active component (61) changes the light power guided onto the image detector (63) during the acquisition time and is synchronized with the image detector via a control and drive unit (64). Through proper control of the amount of light reaching the image detector, the object trace, for example at the end of an acquisition on the image detector, is changed, or more precisely, broadened in such a way that a graphical direction information results.

Figure 6:
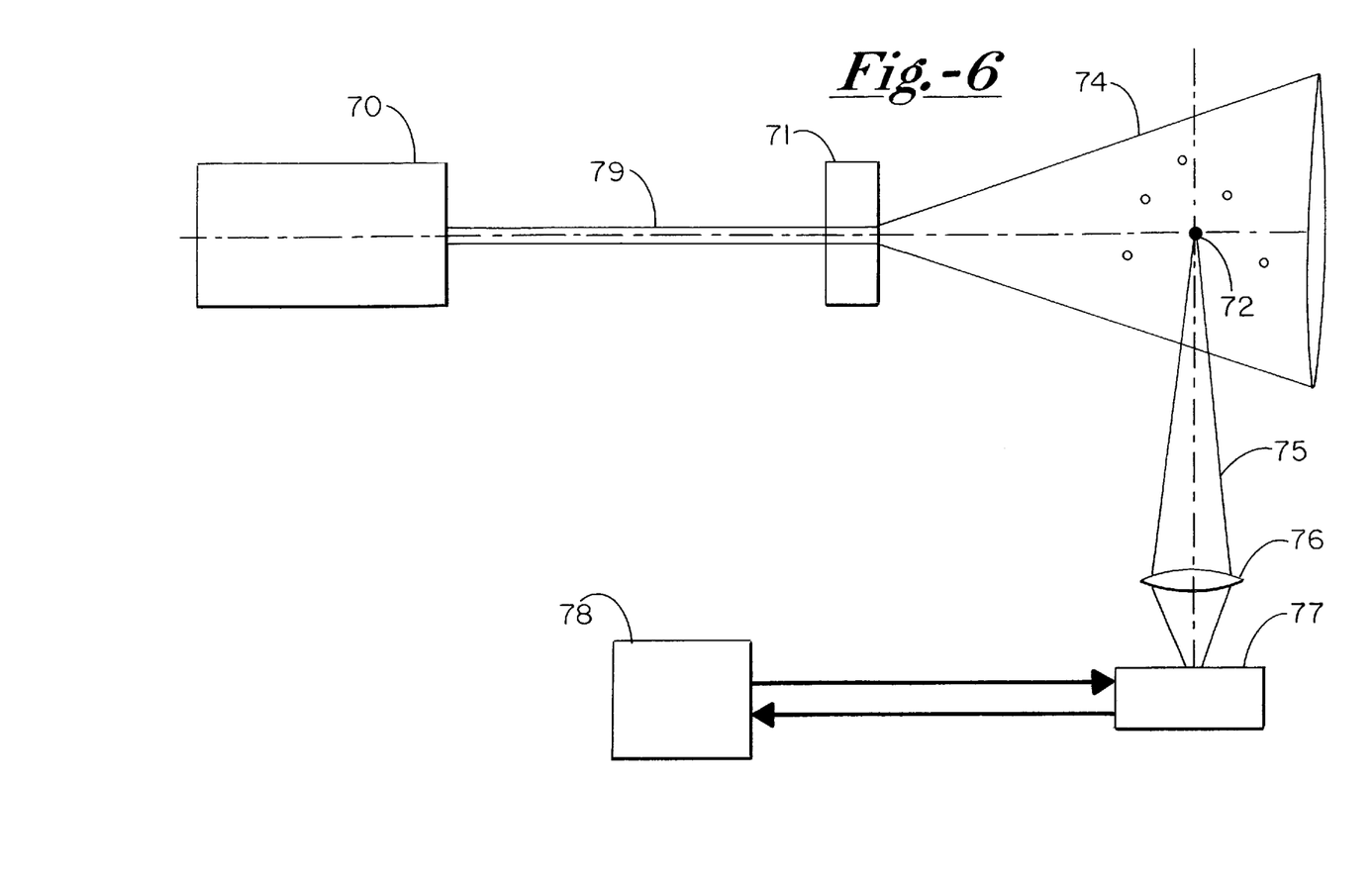
FIG. 6 shows an implementation of the invention in which the sensitivity of the image detector is changed during the acquisition.

FIG. 6 shows a light beam (79) of a laser (70) broadened out by a sending optic (71) and forms a light plane (74) through which objects move. The scattered light (75) is guided by way of a lens (76) onto the image detector (77), whose sensitivity is changed during the acquisition time by a control or drive unit (78). Through a changing of the sensitivity, for example at the end of the acquisition or integration time of the image detector, the object traces receive the desired graphical direction information.

Figure 7:
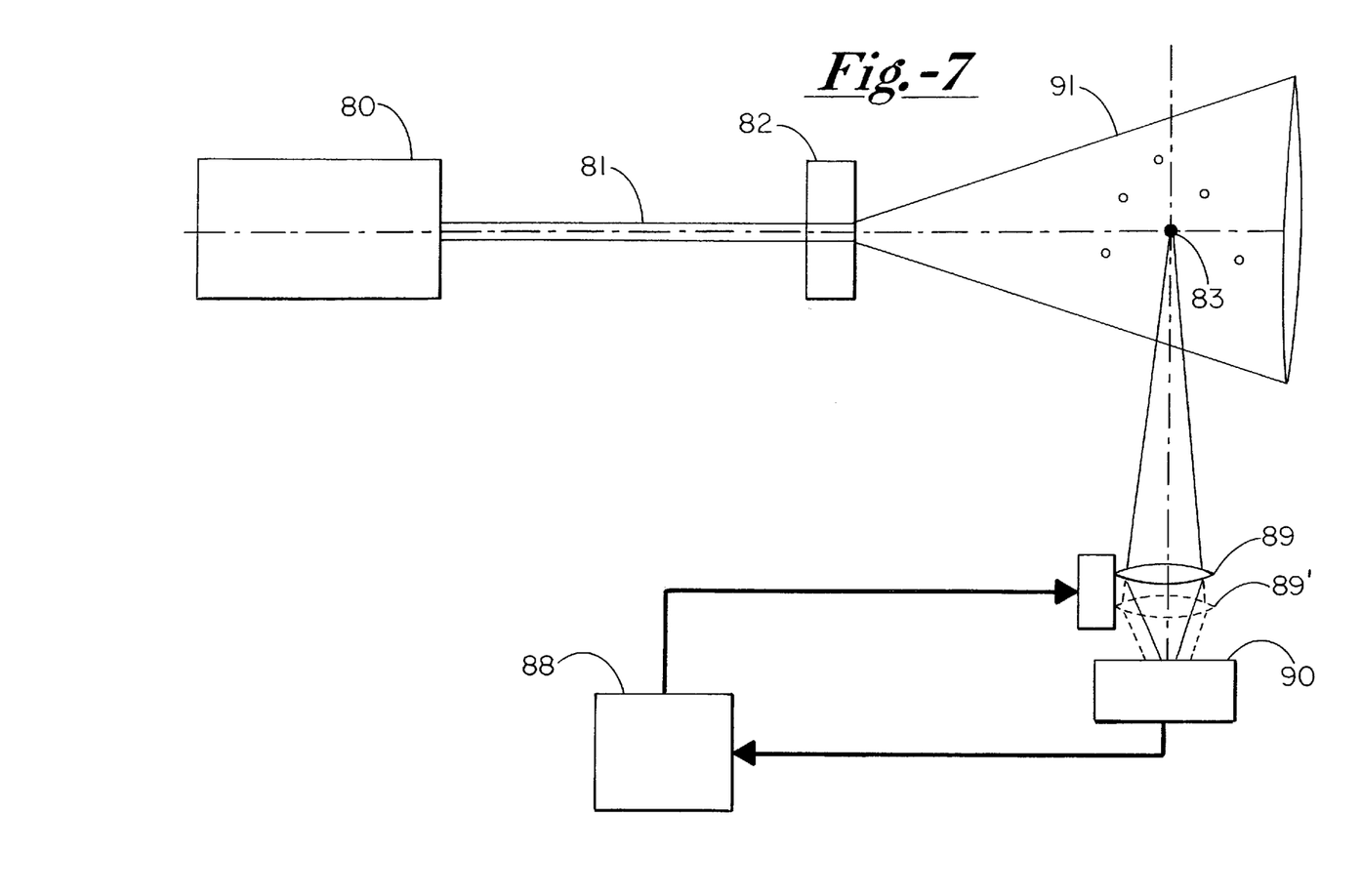
FIG. 7 shows an implementation of the invention in which the reception optics are changed during the acquisition time by means of adjustment components.

FIG. 7 shows an implementation of the invention in which a light beam (81) of a laser (80) is broadened out by sending optics (82) and forms a light section (91). Objects (83), which move in the light section, scatter the light, which is directed by a lens (89) on the image detector (90). Using adjustment components, the lens (89) is displaced (89') during the acquisition time, so that the recorded object trace receives through the deliberate defocusing a broadening, which can be used for the production of direction information. The displacing of the lens (89,89') or of the collective receiving optic comes about through a drive or control unit (88) that is synchronized with the image detector (90).

Figure 8:
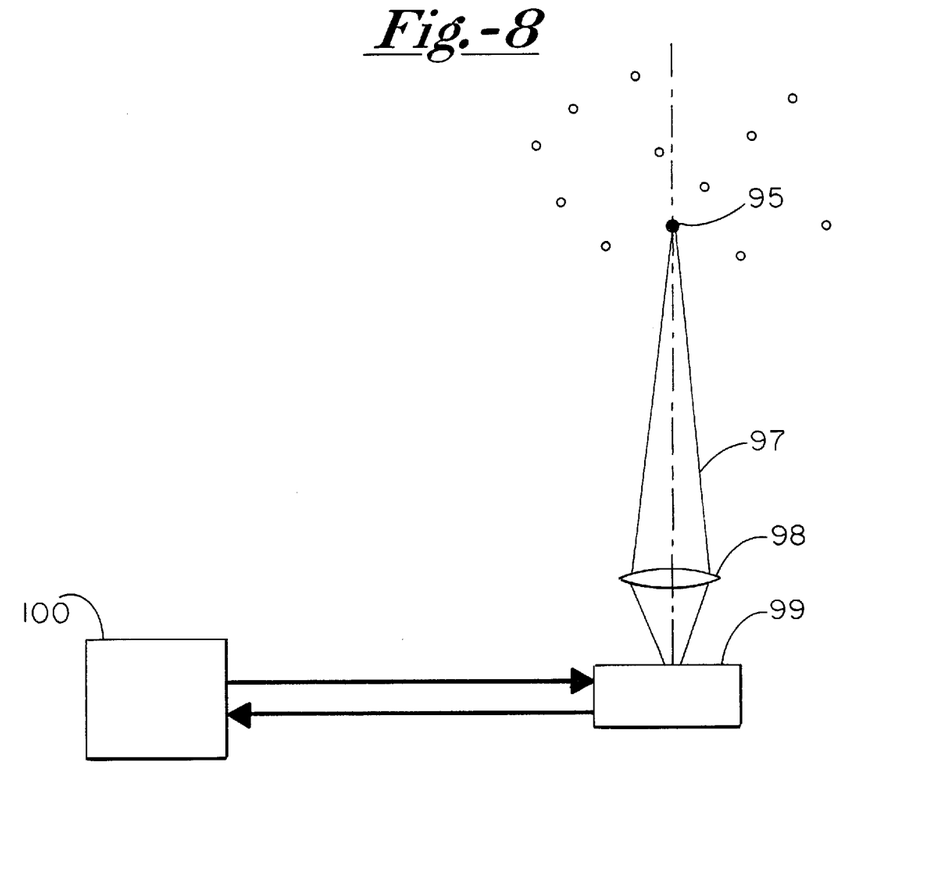
FIG. 8 shows an implementation of the invention in which followed objects are self-illuminating and not additionally illuminated, and the sensitivity of the image detector is changed during the acquisition time.

FIG. 8 shows that the invention is not restricted to the illumination of objects, but rather that the traces of luminous objects (95) can likewise by analyzed and provided with graphical direction information in real time. The light from the objects (97) is led by way of a lens (98) onto the image detector (99), which is changed in its sensitivity during the acquisition time, for example electronically through a drive and control unit (100), whereby the recorded object traces can be broadened and graphical direction information can be produced.

What is claimed is:

1. A process for generating visible directional and velocity information that arises during a finite acquisition time through an imaging of moving objects on an image detector, characterized in that during the finite acquisition time, at least one selected process parameter is so changed that the width of the resulting object trace undergoes such a change that the object trace takes on the form of a vector.

2. The process according to claim 1 wherein the objects are illuminated during the acquisition time, and the change of the selected process parameter consists of a change in the illumination power.

3. The process according to any one of the preceding claims, further characterized in that the light received by the image detector which emanates from the objects or is reflected by them is changed during the acquisition time in its power between the object and the image detector.

4. The process according to claim 1, further characterized in that during the acquisition time the image detector is moved by adjustment elements.

5. The process according to claim 1, further characterized in that during the acquisition time a receiving optical system or components of the receiving optical system, placed before the image detectors are moved by adjustment elements.

6. The process according to claim 1, further characterized in that during the acquisition time a sending optical system or components of the sending optical system, arranged after the light source for illumination of the objects, are moved by adjustment elements.

7. The process according to claim 1, further characterized in that a sensitivity of the image detector is changed during the acquisition time.

8. The process according to claim 4 or claim 5, further characterized in that during the acquisition time the sending or receiving optical system is defocused.

9. The process according to claim 1, further characterized in that the moving objects are light-scattering or light-emitting objects like molecules or small particles.

10. The process according to claim 1 or 2, wherein the objects are illuminated, further characterized in that for the illumination of the object the light beam of at least one laser or of at least one incoherent sources is provided.

11. Process according to claim 1 or claim 2, wherein the objects are illuminated, further characterized in that the illuminated measurement space in which the object is located is formed as a light section, wherein the beam of a light source either is spread out in a plane or is scanned over a plane by means of deflecting elements and forms a light section.

12. A device for generating visible directional and velocity information of object traces, for implementing the process according to any one of the preceding claims, consisting of: (i) at least one light source (2,20,45,55,70,80) for illumination of a measurement space, in which objects (1,23, 45,57,72,83,95) move; (ii) one or several components (4,6, 21,41,61,71,82) in the beam path for changing of the same or of the light power; and (iii) at least one image detector (3,28,53,63,77,90,99), on which during a finite acquisition time object traces arise through the imaging of moving objects, whereby at least one of these components is influenced in such a way that through this the width of the object trace is changed during the acquisition time, so that preferably the form of an arrow or vector results.

13. The device according to claim 12, further characterized in that for the changing of the illumination power during the acquisition time, mechanical, electrical, optical, electro-optical, acousto-optical or electronic components (4) are provided.

14. The device according to claim 12, further characterized in that the power of the light emanating from the objects (1) and received by at least one image detector (3), is changed during the acquisition time by mechanical, electrical, optical, electro-optical, acousto-optical or electronic components (6) introduced into the beam path between the measurement location (5) and the image detector (3).

15. The device according to claim 12, further characterized in that during the acquisition time the image detector (3) is moved by adjustment elements (8).

16. The device according to claim 12, with a receiving optical system for reproducing the objects, further characterized in that the receiving optical system (7) or components of the receiving optical system are moved by adjustment elements (9).

17. The device according to claim 12, further characterized in that a sending optical system (10) or components of the sending optical system placed after the light source (2) are moved by adjustment elements (11).

18. The device according to claim 15 or 16, further characterized in that during the acquisition time a defocusing of the transmission (10) or receiving optics (7) occurs by the adjustment elements (9,11).

19. The device according to claim 12, further characterized in that the sensitivity of the image detector (3) is changed during the acquisition time.

20. The device according to claim 12, further characterized in that for the illumination of the objects a laser or at least one incoherent light source is provided.

21. The device according to claim 12, further characterized in that the illuminated measurement space, in which the objects move, consists of a light section.

22. The device for making visible direction and velocity information on object traces, for implementing the process according to claim 1, with at least one image detector (3,28,53,63,77,90,99) on which the object traces arise during a finite acquisition time through an imaging of moving objects, whereby its sensitivity is influenced so that through this the width of the object trace is changed during the acquisition time, so that preferably the form of an arrow or vector results.

23. A process for generating in real-time an object trace that visually indicates direction, including:

causing an object to move through a measurement space;

disposing an image detector with respect to the measurement space, and using the image detector to detect light received from the object and thereby generate an object trace corresponding to movement of the object within the measurement space during a finite acquisition time; and during a predetermined portion of the finite acquisition time, altering at least one of several parameters governing a width of the object trace, whereby the generated object trace includes a visually perceptible segment of greater width corresponding to said predetermined portion of the finite acquisition time, whereby the object trace visually indicates direction.

24. The process of claim 23 wherein:

said object is illuminated by a light source as it travels within the measurement space, and said at least one parameter includes an intensity of illumination from said source.

25. The process of claim 24 further including:

interposing an optical component between the light source and the measurement space, wherein said altering of at least one parameter includes controllably adjusting the optical component.

26. The process of claim 23 wherein:

said at least one parameter includes a sensitivity of the image detector.

27. The process of claim 23 further including:

interposing an optical component between the measurement space and the image detector, wherein said altering of at least one parameter includes controllably adjusting the optical component.

28. The process of claim 27 wherein:

said altering of at least one parameter includes controllably moving the optical component during said finite acquisition time to defocus the object trace.

29. The process of claim 23 wherein:

said altering of at least one parameter includes controllably moving the image detector, relative to the measurement space, during said finite acquisition time.

* * * * *